(12) United States Patent
Gannon

(10) Patent No.: US 6,994,592 B1
(45) Date of Patent: Feb. 7, 2006

(54) UNIVERSAL CHARGING APPARATUS

(75) Inventor: Daniel J. Gannon, Irvine, CA (US)

(73) Assignee: Hop-On Wireless, Inc., Irvine, CA (US)

( * ) Notice: Subject to any disclaimer, the term of this patent is extended or adjusted under 35 U.S.C. 154(b) by 0 days.

(21) Appl. No.: 10/928,841

(22) Filed: Aug. 27, 2004

(51) Int. Cl.
   *H01R 31/00* (2006.01)

(52) U.S. Cl. ............ 439/638; 439/501; 439/668; 439/669; 320/111

(58) Field of Classification Search ........... 439/638, 439/501, 668, 669; 320/111
See application file for complete search history.

(56) References Cited

U.S. PATENT DOCUMENTS

| | | | |
|---|---|---|---|
| 5,170,067 A * | 12/1992 | Baum et al. ............ 307/10.1 | |
| 5,679,017 A | 10/1997 | Smith | |
| 5,822,427 A | 10/1998 | Braitberg et al. | |
| 5,844,472 A | 12/1998 | Lee | |
| 5,847,545 A | 12/1998 | Chen et al. | |
| 5,918,187 A * | 6/1999 | Weng ............ 455/573 | |
| 6,059,081 A | 5/2000 | Patterson et al. | |
| 6,064,177 A | 5/2000 | Dixon | |
| 6,127,803 A | 10/2000 | Wang et al. | |
| 6,191,552 B1 | 2/2001 | Kates et al. | |
| 6,509,659 B1 | 1/2003 | Carroll et al. | |
| 6,551,142 B2 * | 4/2003 | Eisenbraun ............ 439/668 | |
| 6,624,616 B1 | 9/2003 | Frerking et al. | |
| 6,664,758 B2 * | 12/2003 | Yang ............ 320/107 | |
| 6,767,256 B1 * | 7/2004 | Faerber et al. ............ 439/668 | |
| 6,786,743 B2 * | 9/2004 | Huang ............ 439/131 | |

FOREIGN PATENT DOCUMENTS

| WO | WO-02/091538 A1 | 11/2002 |
|---|---|---|
| WO | WO-03/088632 A1 | 10/2003 |

* cited by examiner

*Primary Examiner*—Tho D. Ta
(74) *Attorney, Agent, or Firm*—The Law Offices of Robert T. Braun; Robert T. Braun; Clay E. Gaetje

(57) ABSTRACT

A universal charging apparatus has a housing, a neck bendably connected to the housing, and an electrical cord which is preferably retractable. The electrical cord is spooled around a retracting spool located inside the housing, allowing the electrical cord to extend by pulling, or retract by activating a switch. The electrical cord has a tip adapted to receive one of a plurality of adapters, each adapter being suitable for connecting the tip to a different one or more electrical devices. The neck has an electrical conductor for connecting with an electricity source and supplying electricity through the electrical cord to the device. An integrated circuit chip adapts the electrical characteristics to be suitable for the different devices to be charged or powered. A ratchet connected to the neck allows the neck to stop in multiple positions, but to allow a user to bend the neck to a different position with slight force. The housing may also have a faceplate and status indicator, such as a light emitting diode. There also may be protrusions molded into the housing to provide additional grip.

36 Claims, 4 Drawing Sheets

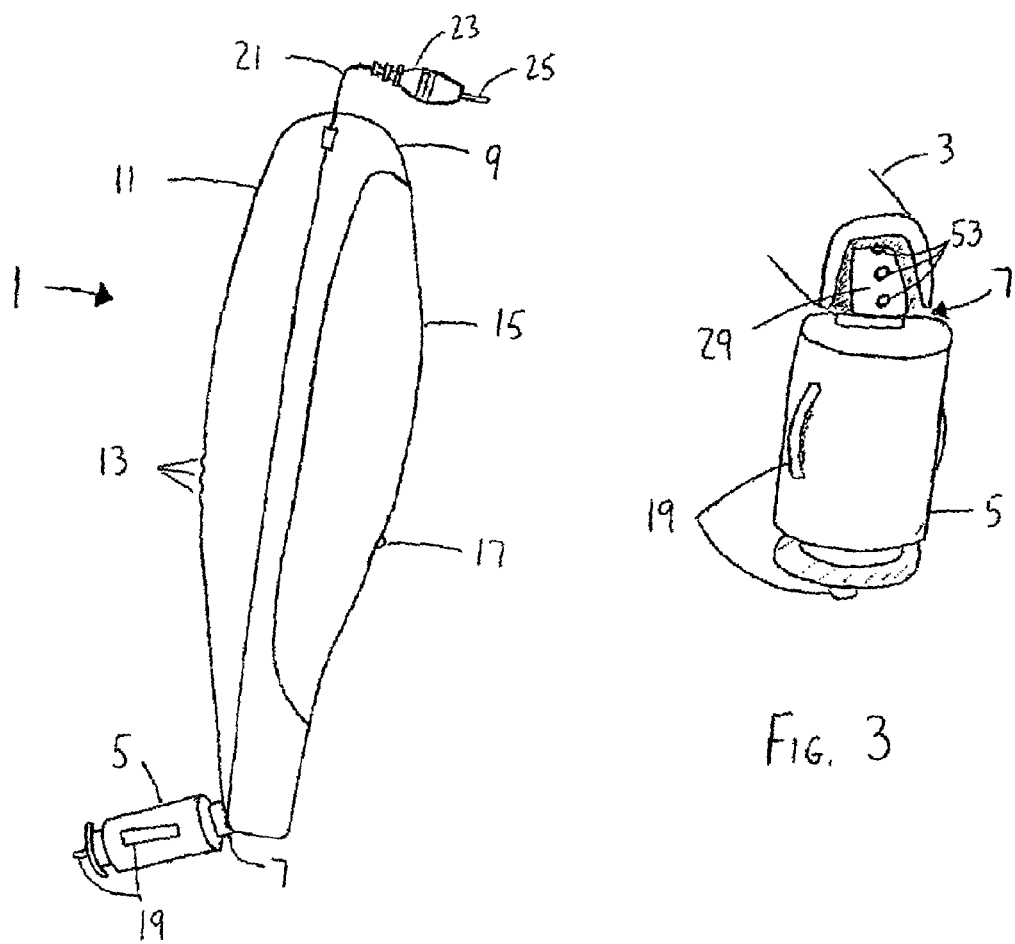

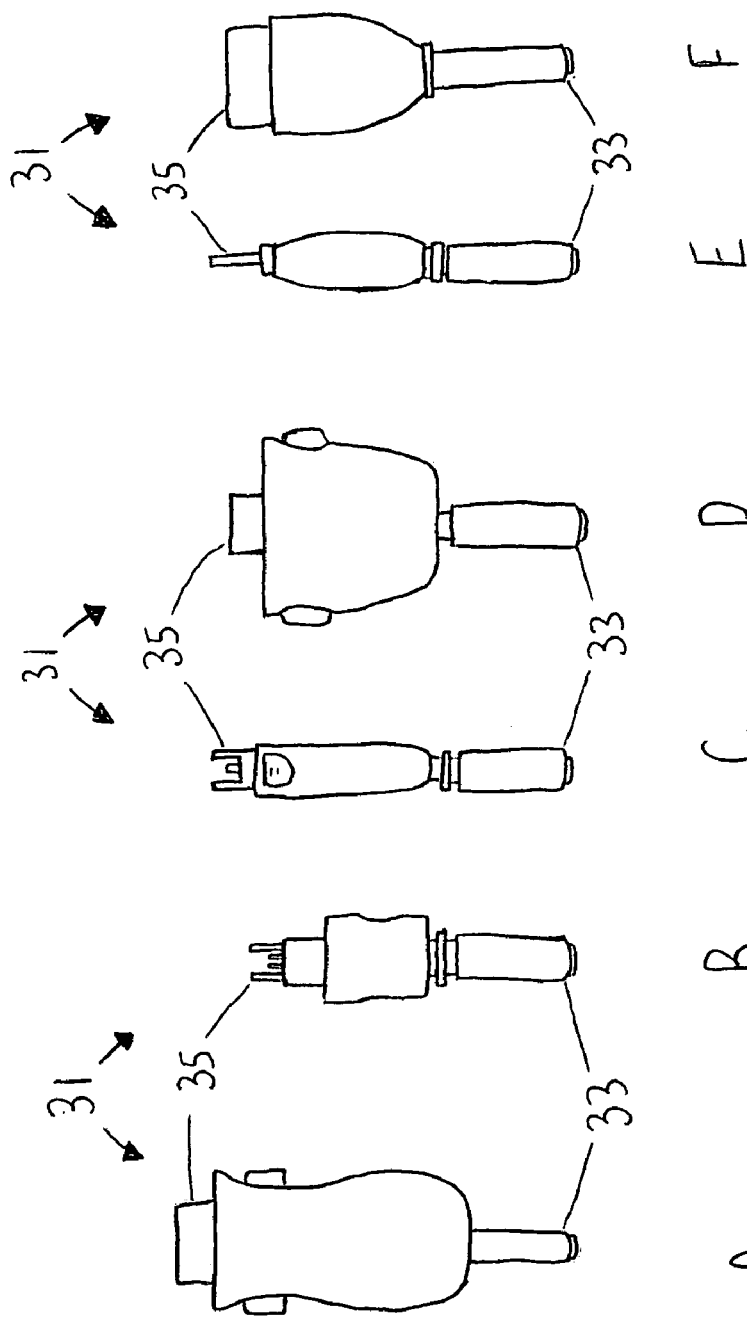

US 6,994,592 B1

UNIVERSAL CHARGING APPARATUS

BACKGROUND OF THE INVENTION

Field of the Invention

The present invention relates to electrical power adapters, and more particularly to electrical powering and recharging adapters. The apparatus allows powering or recharging devices with different power outlet configurations, and is flexible in shape to permit use in a variety of locations. Further, the apparatus has an electrical cord which extends or retracts, thereby furthering the number and scope of suitable locations.

Prior art chargers have attempted to provide universal charging capabilities with removable connectors mimicking the physical connections of the various devices. These attempts do not address the more important consideration of the different electrical requirements of the various devices. Transformers and other charging apparatuses work within a narrow range of voltages and currents. These ranges differ from device to device, and often do not overlap. Therefore, even though the physical connections may be appropriate, the chargers will not function universally because the voltages provided and currents drawn are outside their operational ranges.

SUMMARY OF THE INVENTION

According to one aspect of the invention, a universal charging apparatus is provided for providing power to or recharging an electrical device. The apparatus has a housing, and an electrical cord extending from inside to outside the housing. The electrical cord has an extended position where at least a substantial length of the cord is outside the housing, and a retracted position where substantially all of the cord is inside the housing. The cord has a tip on the end outside the housing. The tip can connect to one of a plurality of adapters, and each adapter in turn can connect to one or more electrical devices requires different connectors. Inside the housing is a retracting spool, for spooling the electrical cord in the retracted position. A switch on the housing retracts the electrical cord.

A neck is connected to the housing, and can be bent relative to the housing in at least one direction. According to one aspect of the invention, the neck is connected with a ball joint, and can bend through an angle of approximately ninety degrees. The neck is further connected to a ratchet, allowing the neck to stop in a plurality of positions relative to the housing, yet allowing the user to bend the neck to a different position with slight force. The neck has an electrical conductor to connect with an electricity source. The electrical conductor is electrically connected to the electrical cord for supplying electricity through the cord to a device.

According to another aspect of the invention, the housing is made of a top and a bottom. A faceplate may be attached to the housing, preferably to the top. The faceplate may depress slightly into the housing.

According to another aspect of the invention, the housing may have one or more protrusions extending from it to facilitate gripping of the housing. The protrusions may be molded into the housing, and may be located on the bottom.

According to yet another aspect of the invention, a status indicator is provided. The status indicator provides the user information on the status of the operation of the apparatus, such as whether electricity is being supplied to a device, or whether the device no longer requires electricity. The status indicator may be visual, such as a light emitting diode, or several light emitting diodes. A light emitting diode may emit light of different colors to indicate different statuses.

According to a further aspect of the invention, an integrated circuit chip is electrically connected between the electrical cord and the electrical conductor. The integrated circuit chip adapts the electrical characteristics to be suitable for the different devices to be charged or powered. The integrated circuit chip may also obtain feedback from the device to be charged or powered, and may control the status indicator.

BRIEF DESCRIPTION OF THE DRAWINGS

The foregoing and other objects, features and advantages of the invention will be apparent from the following more particular description of a preferred embodiment of the invention as illustrated in the accompanying drawings wherein:

FIG. 2 shows a side view of the universal charging apparatus, according to the present invention.

FIG. 3 is a cutaway of the joint between the housing and the neck, according to the present invention.

FIG. 4 shows several electrical adapters, according to the present invention.

DETAILED DESCRIPTION OF THE PREFERRED EMBODIMENT

Figure 1:
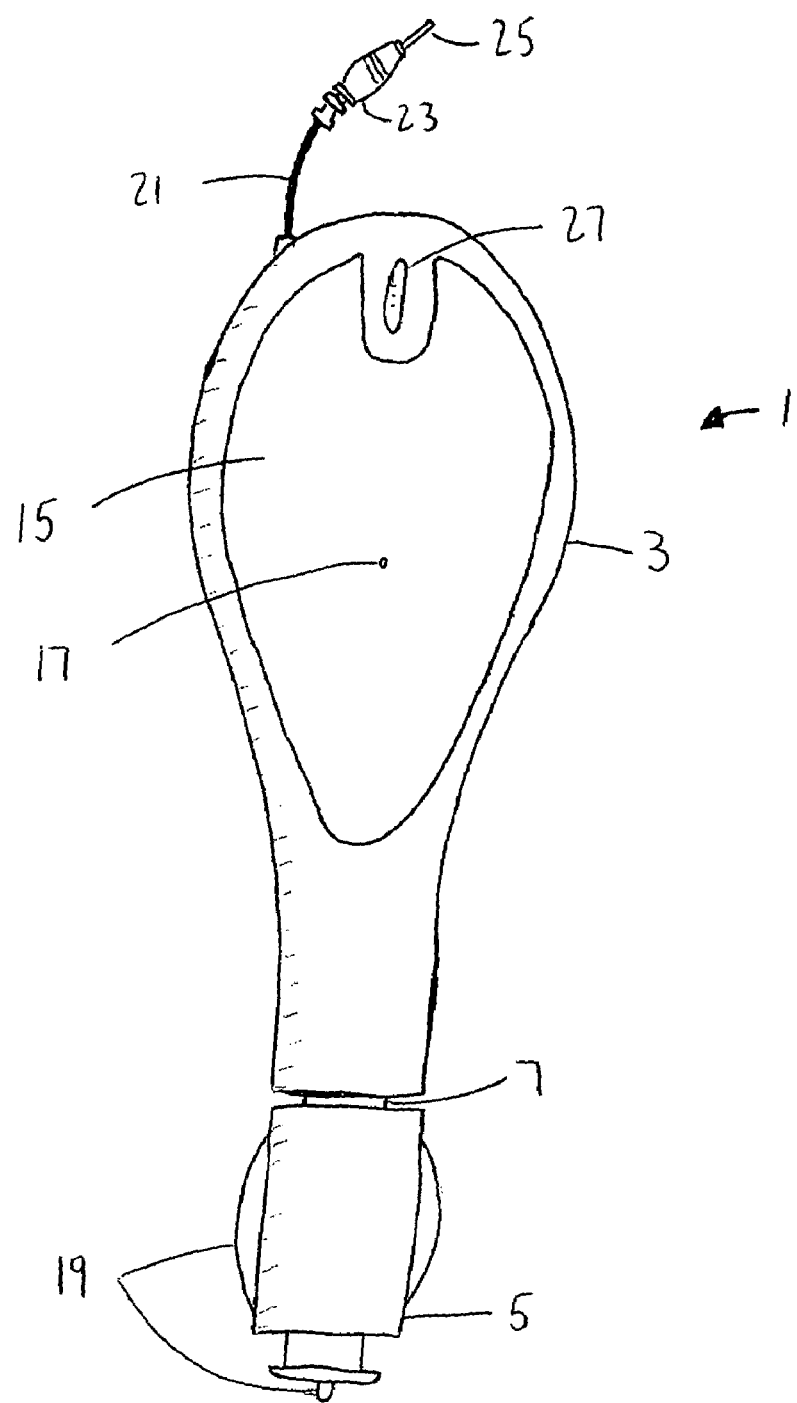
FIG. 1 shows a top view of the universal charging apparatus, according to the present invention.

Throughout the drawing figures, the same reference numeral has been used to label the same feature or element.

Referring generally to FIGS. 1 and 2, there is shown a universal charging apparatus 1, according to the present invention. The universal charging apparatus 1 has a housing 3 and a neck 5, connected to each other with a joint 7. Preferably, the housing 3 comprises a top 9 and a bottom 11, shown more clearly in FIG. 2. The bottom preferably has one or more protrusions 13 extending from it, and preferably molded into it, to facilitate gripping of the apparatus 1 by a user.

The housing 3 may include a faceplate 15. The faceplate 15 may be removable, and is preferably connected over a substantial portion of the top 9. The faceplate 15 may have a company logo or other decorations. Most preferably, the top 9 will have a slight recess, to allow the bottom of the faceplate 15 to be depressed slightly below the surface of the housing 3. Preferably, the housing 3, top 9, bottom 11, neck 5, joint 7, and faceplate 15 are all made of non-conductive material, and most preferably molded plastic.

The apparatus 1 preferably has a status indicator 17, which is preferably a light emitting diode or a plurality of light emitting diodes. The status indicator 17 can indicate to a user several statuses of the apparatus 1. For example, the status indicator 17 can indicate whether electricity is being supplied to a device through said apparatus 1, or whether the device no longer requires electricity, such as when a recharge is complete. Other statuses can be indicated as appropriate or necessary.

In the preferred embodiment where the status indicator 17 is a light emitting diode, the diode can emit different colors of light to indicate different statuses. For example, yellow light can indicate that a device is charging, green can indicate that a charge is complete, and red can indicate a problem. Of course, other indicators such as audible or vibrating indicators could be used, but preferably the status indicator 17 is a visual indicator such as a light emitting diode, and more preferably a blue sapphire power light emitting diode.

The neck 5 has on its surface one or more electrical conductors 19. The electrical conductors 19 are adapted connect with an electricity source (not shown), for supplying electricity through the apparatus 1. As shown in the drawing figures, the electrical conductors 19 are preferably adapted to a direct current power source, such as a car lighter or car power supply, but a connector for any suitable power source, such as direct connection to batteries or an alternating current power source are acceptable.

Extending from inside the housing 3 to outside the housing 3, is an electrical cord 21. The electrical cord 21 is electrically connected to the electrical conductors 19, for receiving electricity from an electricity source. The status indicator 17 is also electrically connected to the electrical cord 21, to be able to monitor the electricity through the apparatus 1. At the end of the electrical cord 21 outside the housing 3 is a tip 23. The tip 23 has an electrical connector 25 which is shaped to connect to a particular device or family of devices. In the preferred form, the electrical connector 25 is shaped to power or recharge a wireless or cellular telephone manufactured by Nokia.

Although the electrical cord 21 may be fixed in relation to the housing 3, preferably the electrical cord 21 is retractable. In this preferred embodiment, the electrical cord 21 has a retracted position, where substantially the entire length of the electrical cord 21 is retracted into the housing 3, and only the tip 23 remains outside the housing 3. Of course, in actual operation a very small length of the electrical cord 21 may remain outside the housing 3, but the length is very short. When the user pulls on the tip 23, the electrical cord 21 extends to one or more stable extended positions, where both the tip 23 and a substantial length of the electrical cord 21 are outside the housing 3. Preferably, the maximum extended position is close to the entire length of the electrical cord 21, which is preferably approximately forty-four inches in length.

The retractability of the electrical cord 21 offers certain advantages. It is often necessary to have a fairly long electrical cord 21, when the electrical device cannot be placed physically near the electricity source. However, when not in use, non-retractable electrical cords are difficult to store, usually requiring the user to wrap the cord around their charger. The retractability allows the user to access a very long electrical cord 21, while making storage of the electrical cord 21 simple and effective.

Also, there are times and configurations where a shorter electrical cord 21 is desirable. The retractability allows the user to use only a portion of the electrical cord 21, leaving the rest of the electrical cord retracted.

Located on the housing 3, and preferably on the top 9, is a switch 27. The switch 27 may be a slide, a button, or any other suitable control. When the user activates the switch 27, by either pressing the button, sliding the slide, or otherwise activating it, the electrical cord 21 retracts from an extended position to the retracted position. If the user releases the switch 27 prior to the electrical cord 21 reaching the fully retracted position, the electrical cord 21 will stop in a semi-retracted, semi-extended position.

Referring to FIG. 3, there is shown a close up of the joint 7 connecting the housing 3 to the neck 5. The joint 7 is preferably a ball joint 29, which allows the neck 5 to bend relative to the housing 3 in at least one direction. Preferably, the neck 5 can bend through an angle of approximately ninety degrees. Located inside the joint 7 is a ratchet 53. The ratchet 53 allows the neck 5 to stop in a plurality of positions relative to the housing 3. FIGS. 1 through 3 show three such different positions. The ratchet 53 keeps the neck 5 in place from gravity, vibrations, or minor shocks, but the user can easily bend or straighten the neck 5 with application of slight force.

The joint 7 allows the apparatus 1 to be used with a variety of different automobiles and other electricity sources. Because different automobiles have lighters and DC power outlets in different places and configurations, a single fixed shape of housing 3 and neck 5 would not work equally well in all automobiles. By allowing bending between the housing 3 and neck 5, the apparatus 1 can be used in many more locations.

Although the neck 5 is shown to be bendable, the housing 3 and neck 5 may be fixed relative to each other. In that embodiment, the joint 7 would not be necessary, and the advantages listed above for the joint 7 would not be enjoyed.

Referring to FIG. 4, there are shown several embodiments of electrical adapters 31, according to the present invention. These electrical adapters 31 each have a common shaped universal connector 33. The universal connector 33 is shaped to receive the electrical connector 25 on the tip 23 of the electrical cord 21. By changing electrical adapters 31, the apparatus 1 can be used with many more wireless telephones, cellular telephones, and other devices. Although the electrical adapters 31 shown here all adapt to wireless or cellular telephones, other electrical adapters 31 could be shaped for other devices with similar electrical consumption.

Each of the electrical adapters 31 has a proprietary or otherwise non-universal tip 35, adapted to connect with one or a family of electrical devices. The tip 35 shown in FIG. 4, Line A, adapts to certain Samsung telephones. The tip 35 shown in FIG. 4, Line B, adapts to certain Sony/Ericsson telephones. The tip 35 shown in FIG. 4, Line C, adapts to certain Motorola telephones. The tip 35 shown in FIG. 4, Line D, adapts to certain LG telephones. The tip 35 shown in FIG. 4, Line E, adapts to certain Samsung telephones, different from those in FIG. 4, Line A. The tip 35 shown in FIG. 4, Line F, adapts to certain Siemens telephones.

In a preferred embodiment, each of the electrical adapters 31 locks into place on the tip 23 by a tab (not shown) or other suitable locking mechanism. The electrical adapters 31 are locked against vibration, gravity, jostling, or other inadvertent disconnection, but can be easily removed a user. Another suitable mechanism is simply a pressure fit around the electrical connector 25.

Figure 5:
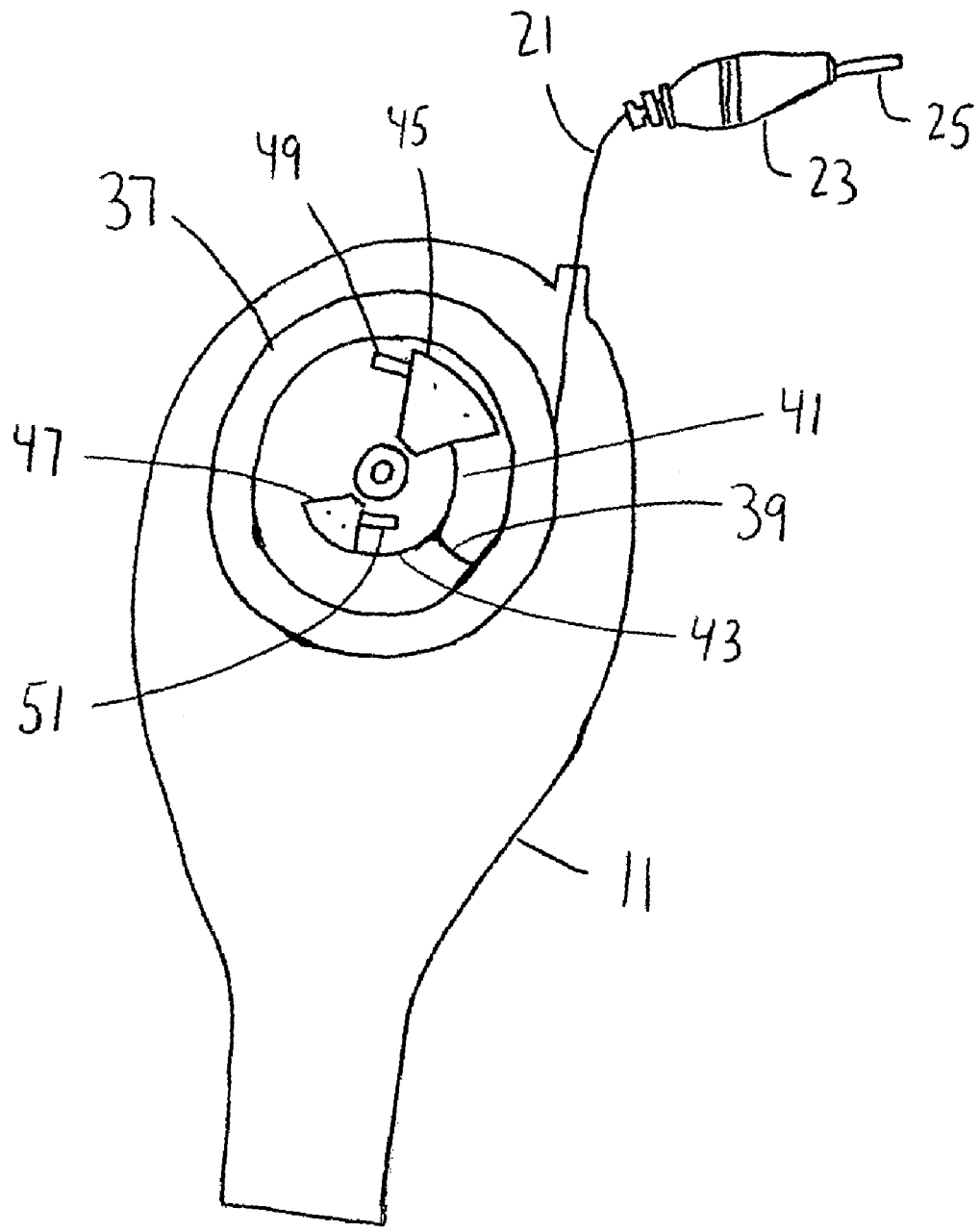
FIG. 5 shows a cutaway view of the housing of the universal charging apparatus, according to the present invention.

Referring to FIG. 5, there is shown a cutaway view of the housing 3 of the apparatus 1, according to the present invention. This cutaway view shows the preferred structures for extending and retracting the electrical cord 21. A retracting spool 37 is attached to the housing 3, and preferably to the bottom 11. The electrical cord 21 is stored, or spooled, around the circumference of the retracting spool 37. As the electrical cord 21 is extended, the retracting spool 37 feeds out the electrical cord 21, and ratchets so the electrical cord 21 remains extended. When the user activates the switch 27, the retracting spool 37 begins winding up the electrical cord 21, until either the switch 27 is deactivated, or the tip 23 reaches the housing 3.

A portion 39 of the electrical cord 21 extends into a hollow central cavity of the retracting spool 37. The individual wires 41, 43 are then individually connected to conductive plates 45, 47, respectively. Conductive plates 45, 47 each have protrusions 49, 51, respectively, at different radii relative to the retracting spool 37. Protrusion 51 is designed to contact a lead (not shown), which is annular or circular in shape, but does not rotate. Protrusion 49 is designed to contact an annular lead (not shown), which has a larger inner radius than the other lead, and also does not rotate. The leads are electrically connected to the electrical conductors 19, thereby creating a full electrical loop when both ends of the apparatus 1 are appropriately connected.

It is preferable to connect an integrated circuit chip (not shown) between the leads and the electrical conductions 19. The integrated circuit chip is preferably physically located within the housing 3, and performs several critical functions. First, the integrated circuit chip controls the status indicator 17. Second, the integrated circuit chip monitors feedback from the electrical device being powered or charged, to determine its status or to maximize the charge imparted.

Third, and most importantly, the integrated circuit chip controls the voltage and increases the tolerances, to provide charging or powering capabilities for different devices having different power requirements. As an example, a standard Nokia charger requires an initial surge voltage of DC 5.5 V to begin charging. Once the charging (or powering) has begun, the voltage drops to approximately DC 5.0 V, and the charger provides up to 700 mA of current. Other chargers have initial surge voltages ranging from DC 5.1 V to DC 5.5 V, and maximum currents of 650 mA to 700 mA.

These different characteristics prevent standard chargers from being used to charge other devices. Even if the electrical connections were appropriate, the different voltages and currents would be outside the tolerances of the charger, and the charger would not activate.

The integrated circuit chip of the present invention requires only DC 5.3 V to begin charging, and has a higher tolerance. Therefore, if the surge voltage were less than DC 5.3 V, but still within the tolerance of the integrated circuit chip, the charger would still activate. Preferably, the tolerance is +/− DC 0.2 V, much higher than the tolerances in the individual standard chargers.

When charging (or powering) a device, the voltage drops to between DC 4.9 V and DC 5.1 V, and preferably is DC 5.0 V. The maximum current at this level is 700 mA, which is at least as high as the highest current required by the listed mobile telephones.

In a preferred embodiment, a fuse, or other surge protection, is preferably included in the electrical circuit to avoid damaging sensitive electrical equipment from power surges.

While this invention has been described in detail with reference to a certain preferred embodiments, it should be appreciated that the present invention is not limited to that those precise embodiments. Rather, in view of the present disclosure, which describes the current best mode for practicing the invention, many modifications and variations would present themselves to those of skill in the art without departing from the scope and spirit of this invention. The scope of the invention is, therefore, indicated by the following claims rather than by the foregoing description. All changes, modifications, and variations coming within the meaning and range of equivalency of the claims are to be considered within their scope.

What is claimed is:

1. A universal retractable charging apparatus, comprising:
   a housing;
   an electrical cord extending from the inside to the outside of said housing, having at least an extended position where at least a substantial length of said cord is outside of said housing, and a retracted position where substantially all of said cord is inside of said housing;
   a tip on an end of said electrical cord outside of said housing, said tip adapted to receive one of a plurality of adapters, each of said adapters being suitable for electrically connecting said tip to a different one or more devices requiring electricity;
   a retracting spool within said housing for spooling said electrical cord in the retracted position;
   a switch on said housing, activated by a user to change said electrical cord from the extended position to the retracted position;
   a neck, connected to said housing such that said neck can bend relative to said housing in at least one direction;
   a ratchet, connected to said neck to allow said neck to stop in a plurality of positions relative to said housing, and to allow a user to bend said neck to a different position with slight force; and
   an electrical conductor located on said neck to connect with an electricity source, said electrical conductor being electrically connected to said electrical cord for supplying electricity through said cord to a device requiring electricity.

2. A universal retractable charging apparatus as defined in claim 1, further comprising a ball joint connecting said neck to said housing.

3. A universal retractable charging apparatus as defined in claim 1, wherein said switch is a slide.

4. A universal retractable charging apparatus as defined in claim 1, wherein said switch is a button.

5. A universal retractable charging apparatus as defined in claim 1, wherein said neck can bend through an angle of approximately 90 degrees.

6. A universal retractable charging apparatus as defined in claim 5, further comprising a ball joint connecting said neck to said housing.

7. A universal retractable charging apparatus as defined in claim 1, further comprising a faceplate attached to said housing.

8. A universal retractable charging apparatus as defined in claim 7, wherein said faceplate is set at least partially into said housing.

9. A universal retractable charging apparatus as defined in claim 1, wherein said housing comprises a top and a bottom.

10. A universal retractable charging apparatus as defined in claim 9, further comprising a faceplate attached to said top of said housing.

11. A universal retractable charging apparatus as defined in claim 10, wherein said faceplate is set at least partially into said top of said housing.

12. A universal retractable charging apparatus as defined in claim 1, further comprising one or more protrusions extending from said housing to facilitate gripping of said housing.

13. A universal retractable charging apparatus as defined in claim 12, wherein said one or more protrusions are molded into said housing.

14. A universal retractable charging apparatus as defined in claim 9, further comprising one or more protrusions extending from said housing to facilitate gripping of said housing.

15. A universal retractable charging apparatus as defined in claim 14, wherein said one or more protrusions are molded into said housing.

16. A universal retractable charging apparatus as defined in claim 14, wherein said one or more protrusions extend from said bottom of said housing.

17. A universal retractable charging apparatus as defined in claim 1, further comprising a status indicator.

18. A universal retractable charging apparatus as defined in claim 17, wherein said status indicator indicates to the user whether electricity is being supplied to a device through said apparatus.

19. A universal retractable charging apparatus as defined in claim 17, wherein said status indicator indicates to the user whether the device no longer requires electricity.

20. A universal retractable charging apparatus as defined in claim 17, wherein said status indicator is a visual indicator.

21. A universal retractable charging apparatus as defined in claim 20, wherein said status indicator is a plurality of light emitting diodes.

22. A universal retractable charging apparatus as defined in claim 20, wherein said status indicator is a light emitting diode.

23. A universal retractable charging apparatus as defined in claim 22, wherein said light emitting diode emits light of different colors to indicate different statuses.

24. A universal retractable charging apparatus, comprising:

a housing, comprising a top and a bottom;

a faceplate attached to said top of said housing;

an electrical cord extending from the inside to the outside of said housing, having at least an extended position where at least a substantial length of said cord is outside of said housing, and a retracted position where substantially all of said cord is inside of said housing;

a tip on an end of said electrical cord outside of said housing, said tip adapted to receive one of a plurality of adapters, each of said adapters being suitable for electrically connecting said tip to a different one or more devices requiring electricity;

a retracting spool within said housing for spooling said electrical cord in the retracted position;

a switch on said housing, activated by a user to change said electrical cord from the extended position to the retracted position;

a neck, connected to said housing with a ball joint, such that said neck can bend relative to said housing in at least one direction, through an angle of approximately 90 degrees;

a ratchet, connected to said neck to allow said neck to stop in a plurality of positions relative to said housing, and to allow a user to bend said neck to a different position with slight force;

an electrical conductor located on said neck to connect with an electricity source, said electrical conductor being electrically connected to said electrical cord for supplying electricity through said cord to a device requiring electricity; and a status indicator comprising a light emitting diode.

25. A universal retractable charging apparatus as defined in claim 24, further comprising one or more protrusions extending from said housing to facilitate gripping of said housing.

26. A universal retractable charging apparatus as defined in claim 25, wherein said one or more protrusions extend from said bottom of said housing.

27. A universal retractable charging apparatus as defined in claim 26, wherein said one or more protrusions are molded into said bottom of said housing.

28. A universal charging apparatus comprising:

a housing;

an electrical cord extending from the inside to the outside of said housing, wherein said electrical cord has at least an extended position where at least a substantial length of said cord is outside of said housing, and a retracted position where substantially all of said cord is inside of said housing;

a retracting spool within said housing for spooling said electrical cord in the retracted position;

a switch on said housing, activated by a user to change said electrical cord from the extended position to the retracted position;

a tip on an end of said electrical cord outside of said housing, said tip adapted to receive one of a plurality of adapters, each of said adapters being suitable for electrically connecting said tip to a different one or more devices requiring electricity;

a neck connected to said housing;

an electrical conductor located on said neck to connect with an electricity source to supply electricity; and an integrated circuit chip electrically connected to said electrical conductor and to said electrical cord, said integrated circuit chip adapting the electrical characteristics of electricity from the electricity source to characteristics suitable for use with the different one or more devices requiring electricity.

29. A universal charging apparatus as defined in claim 28, wherein said switch is a slide.

30. A universal charging apparatus as defined in claim 29, wherein said switch is a button.

31. A universal charging apparatus comprising in:

a housing;

an electrical cord extending from the inside to the outside of said housing;

a tip on an end of said electrical cord outside of said housing, said tip adapted to receive one of a plurality of adapters, each of said adapters being suitable for electrically connecting said tip to a different one or more devices requiring electricity;

a neck, connected to said housing wherein said neck can bend relative to said housing in at least one direction;

an electrical conductor located on said neck to connect with an electricity source to supply electricity; and an integrated circuit chip electrically connected to said electrical conductor and to said electrical cord, said integrated circuit chip adapting the electrical characteristics of electricity from the electricity source to characteristics suitable for use with the different one or more devices requiring electricity.

32. A universal charging apparatus as defined in claim 31, further comprising a ball joint connecting said neck to said housing.

33. A universal charging apparatus as defined in claim 31, further comprising a ratchet connected to said neck to allow said neck to stop in a plurality of positions relative to said housing, and to allow a user to bend said neck to a different position with slight force.

34. A universal charging apparatus as defined in claim 31, wherein said neck can bend through an angle of approximately 90 degrees.

35. A universal charging apparatus as defined in claim 34, further comprising a ball joint connecting said neck to said housing.

36. A universal charging apparatus, comprising:

a housing:

an electrical cord extending from the inside to the outside of said housing;

a tip on an end of said electrical cord outside of said housing, said tip adapted to receive one of a plurality of adapters, each of said adapters being suitable for electrically connecting said tip to one or more devices requiring electricity, wherein said tip is physically adapted to connect directly to a specific type of wireless telephone different than said one or more devices requiring electricity;

a neck, connected to said housing;

an electrical conductor located on said neck to connect with an electricity source to supply electricity; and an integrated circuit-chip electrically connected to said electrical conductor and to said electrical cord, said integrated circuit chip adapting the electrical characteristics of electricity from the electricity source to characteristics suitable for use with the one or more devices requiring electricity.

* * * * *